June 25, 1968     E. G. SCHEIBEL     3,389,970
LIQUID-LIQUID EXTRACTION COLUMN HAVING ROTATABLE
PUMPING IMPELLER ASSEMBLIES
Filed Feb. 15, 1967     2 Sheets-Sheet 1

June 25, 1968  E. G. SCHEIBEL  3,389,970
LIQUID-LIQUID EXTRACTION COLUMN HAVING ROTATABLE
PUMPING IMPELLER ASSEMBLIES
Filed Feb. 15, 1967  2 Sheets-Sheet 2

United States Patent Office 3,389,970
Patented June 25, 1968

3,389,970
LIQUID-LIQUID EXTRACTION COLUMN HAVING ROTATABLE PUMPING IMPELLER ASSEMBLIES
Edward G. Scheibel, 75 Harrison Ave., Montclair, N.J. 07042
Filed Feb. 15, 1967, Ser. No. 616,332
8 Claims. (Cl. 23—270.5)

ABSTRACT OF THE DISCLOSURE

The agitated liquid-liquid extraction column disclosed herein comprises a vertically elongated column divided into a plurality of mixing stages by fixed horizontal baffles, each mixing stage containing a pumping impeller fixed flow control plates and wire mesh deflectors arranged to mix the two liquid phases near the center of the column and to direct the mixed liquid radially to near the column wall where phase separation occurs. The impellers are mounted on an axial rotatable shaft and the shaft-impeller assembly may be removed from the column as a unit through an appropriate opening at the top of the column.

This invention relates to an improved apparatus for counter-current extraction contact of immiscible liquids. More particularly, the invention relates to a novel extraction apparatus of high efficiency and simple design peculiarly adapted to large size columns.

Many forms of multi-stage liquid-liquid extraction columns have been suggested to the art. The agitated column apparatus described in my prior Patent 2,493,265 is illustrative of such columns.

Experience with the extraction column described in Patent 2,493,265 showed that the optimum efficiency of the column depended upon sufficient height of packing between agitators and that the height of the packing had to be increased as column diameter so that in large columns e.g. five feet or more in diameter, the packing (usually wire mesh) constituted a major cost factor. Since the purpose of the packing was provision of baffling between mixing stages, the column described in improvement Patent 2,850,362 attempted to achieve the same effect with less expensive baffles. While the baffles described in 2,850,362 were not as effective and stage efficiencies were lower, still the total cost of a column for a given requirement was smaller when the columns exceeded two feet in diameter. Unfortunately such columns require considerable labor for aligning agitators properly as to make them uneconomic for requirements necessitating very large columns (e.g. eight or more feet in diameter).

The object of the present invention is to proivde an improved agitated column structure.

A further object of this invention is to provide a relatively inexpensive large size multi-stage liquid-liquid extraction column structure.

For detailed understanding of the present invention reference is now made to the attached drawing wherein.

Figure 1:
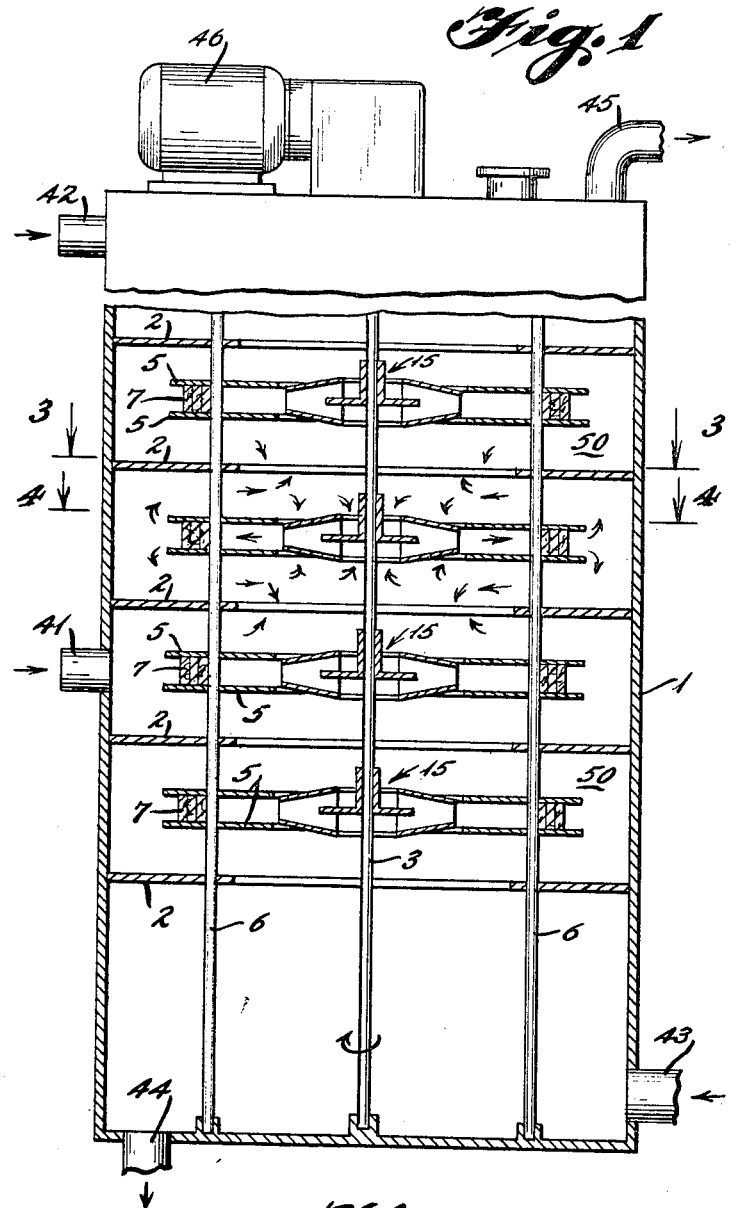
FIGURE 1 is a partial cross-sectional elevation of the agitated extraction column.

Referring now to FIGURE 1 it may be seen that vertically elongated column 1 is provided with horizontal annular baffles, 2, which serve to divide column 1 into a plurality of mixing extraction stages. A vertically elongated rotatable shaft, 3, disposed axially of column 1 has a pumping impeller assembly 15 mounted thereon at the mid point of each stage. Adjacent impeller assembly 15 is a pair 5 of fixed horizontal annular flow control plates, positioned so that one plate 20 is above and one plate 21 is below the outermost edge of impeller assembly 15.

As may be seen in the drawing the inner edges of flow control plates 20, 21 exceed the radial extent of impeller assembly 15 to leave an unencumbered central free space in column 1 large enough for impeller assemblies 15 to be mounted on rotatable shaft 3 outside of the column and then inserted as a prefabricated unit. Also the shaft and impeller assembly may be removed as a unit for cleaning and maintenance of the column.

Flow control plates set 5 are suspended in their mid-stage position on a plurality of support rods 6 spaced apart near the column wall enough to support also the annular baffles 2 which serve as stage dividers.

Figure 5:
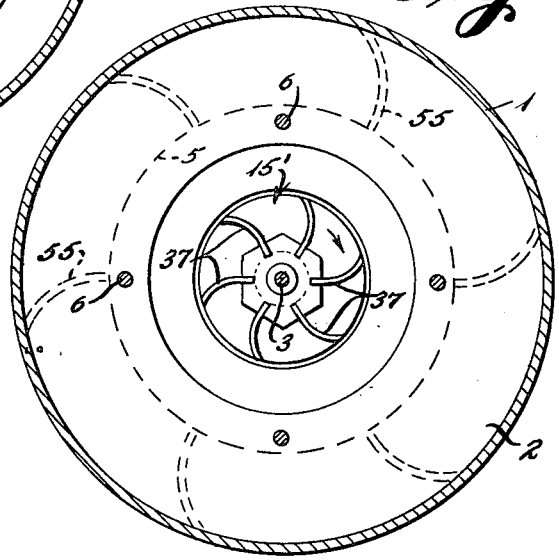
FIGURE 5 is a plan section similar to FIGURES 3 and 4 illustrating an alternative mode of agitator and column structure.

Desirably (but not necessarily) a perforated packing 7, is disposed between the upper and lower flow control plates 20, 21, adjacent the outer peripheral edges thereof. The packing 7 serves to subdivide the liquid impelled therethrough by impeller assembly 15 producing small droplets of the dispersed phase, and thereby providing more efficient contact between the two liquid phases involved in the liquid-liquid extraction being carried out in column 1. The packing material itself may be steel wool or wire mesh, knitted or woven, such for example as has been described in my prior Patent 2,493,265. Packing 7 serves also to eliminate rotational flow of liquid, as may occur under some mixing conditions. A further optional expedient to prevent rotational flow is vertical positioning of curved apertured (e.g. screens) vanes 55 between the stage baffle 2, as is shown in FIGURE 5.

While the actual size of the column 1 and of the various members therein will vary according to particular column requirements, it is important for efficient column operation that the outlet end of flow control plate set 5 be spaced in from the column wall and out from the inner edge of annular baffles 2 (as is shown in the drawings). Thereby a quiescent zone 50 is provided in each stage for phase separation of the fluid mixture leaving flow control plate set 5. Separated light phase then flows radially in from zone 50, above upper flow control plate 20 then past the inner edge of baffle 2 and into the next higher stage, while, correspondingly separated heavy phase flows in radially from zone 50, below lower flow control plate 21, then past the inner edge of baffle 2 and down into the next lower stage through the central aperture of baffle 2.

Thus in each stage, the light phase liquid rising up from the next lower stage and the heavy phase liquid descending from the next higher stage both flow to impeller assembly 15, then are pumped through impeller assembly 15 in an intimate admixture, forced radially out through flow control plate set 5 (and packing 7) to queiscent zone 50. Proper operation of pumping impeller assembly 15 then is most important to efficient extraction and the detailed construction of impeller assembly 15 constitutes an important aspect of the present invention.

The impeller assembly 15 comprises a hub 30 suitably attached to shaft 3 (e.g. by set screws) on which a plurality of flat agitator vanes 31 vertically disposed are mounted in any suitable manner which leaves an upper 28 and lower 27 inlet port to impeller assembly 15 adjacent hub 30. Thus vanes 31 may be directly mounted on hub 30, or, as shown, attached (e.g. welded) to a polygon shaped flange 27 on hub 30. Frustoconical upper cap 31, and inverted frustoconical lower cap 33 surmount blades 31 top and bottom to form therewith an enclosed pumping impeller whose rotation draws liquid in at the central aperture of cap 32, i.e. upper port 28 and at the central aperture 34 of cap 32, i.e. lower port 27 pumping the liquid radially out through opening 35 at the terminal edges of vanes 31 and caps 32, 33. Equal liquid intake at ports 27, 28 from above and below impeller assembly 15, minimizes vertically directed stresses and permits mounting of impeller assembly 15 directly on shaft 3, i.e. without thrust bearings and the like.

An optional curved blade 37 mode as shown in FIGURE 5 serves better to curtail rotational flow of liquid off from agitator blades. The curved blade form may be employed with or without the apertured vanes, also shown in FIGURE 5.

The actual number of agitator blades 31 or 37 in each impeller may vary from two to eight with four or six being most convenient. Also, the agitator blades should be constructed without pitch so as to impart only horizontal flow to the impelled liquid.

In addition, to minimize kinetic energy changes in the liquid flowing through the impeller and to provide for maximum pumping action, the height of agitator vanes 31 and therefore the distance between caps 32, 33 should provide the same area for horizontal flow of the impelled liquid at all radial distances from shaft 3. Also, this horizontal flow area should be equal to the sum of the inlet port areas of the agitator assembly 15, making for example the area of outlet 35 equal to the area of inlet ports 27, 28.

Theoretically caps 31, 32 should be shaped in cross-section as a hyperbola of the form $xy=r^2/2$ where $r$ equals the radius of the inlet port 27 or 28, $x$ is the distance from the center of rotation and $y$ is the distance (vertically) from the center line of impeller assembly 15. As a practical matter the truncated cone shape shown in the drawing is a good approximation of the hyperbolic shape. In addition to the importance of the above detailed construction of impeller assembly 15, so too is its position relative to flow control plate set 5 important to the present invention.

Figure 2:
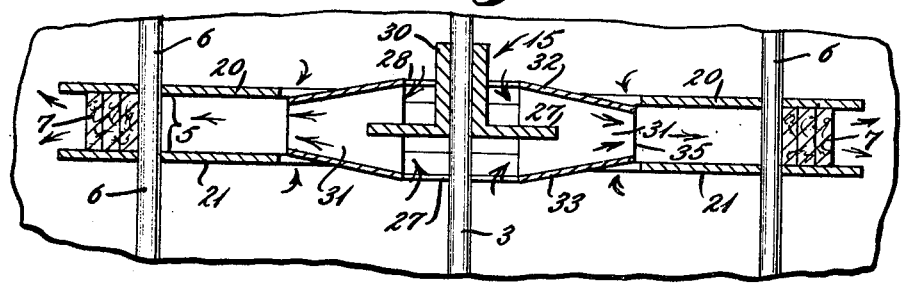
FIGURE 2 is an enlarged cross-sectional elevation view of the agitator structure.
Figure 3:
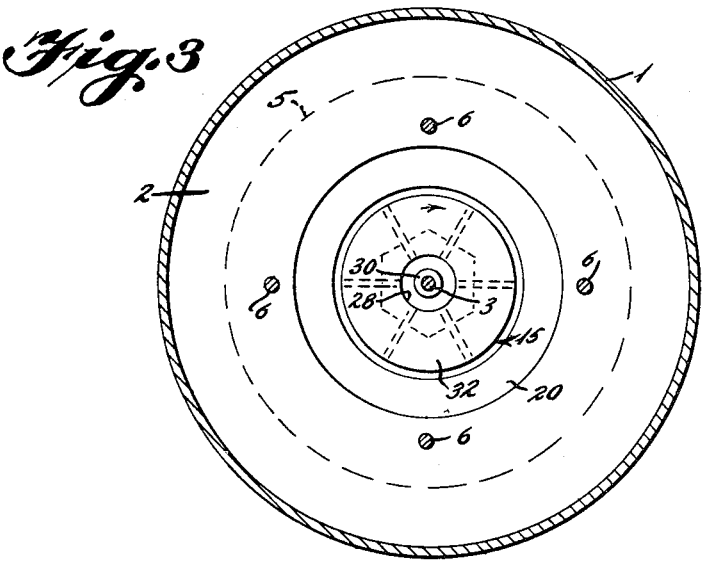
FIGURE 3 is a plan section taken along line 3—3 of FIGURE 1.
Figure 4:
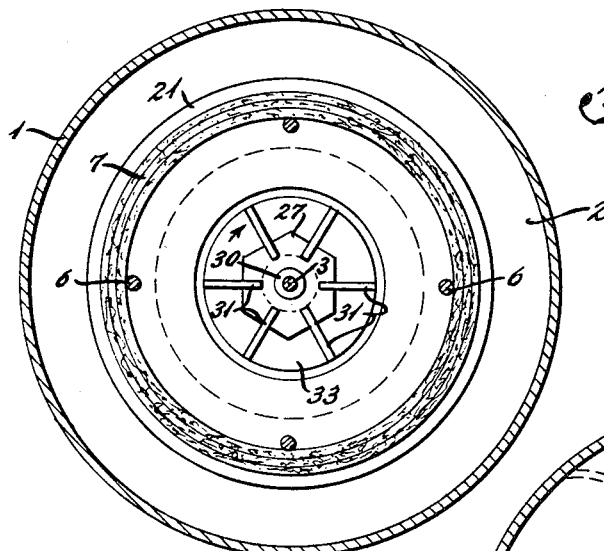
FIGURE 4 is a plan section taken along line 4—4 of FIGURE 1.

Allusion has already been made to the desirability for column fabrication and maintenance purposes of providing radial clearance between the outermost edge of impeller assembly 15 and the inner edge of flow control plate set 5. This radial clearance or gap is significant during operation of the column. In addition, as shown best in FIGURE 2 the spacing between upper and lower flow plates 20, 21 should exceed slightly the height ($2y$) of blades 31 at their outlet 35 from impeller assembly 15. Then, even moderate velocity liquid discharge from the periphery of blades 31 or 37 produces a jet or vena contracta effect just beyond impeller outlet 35 which draws liquid into the mixing region between the flow control plates 20, 21 through the upper and lower gaps just described. This vena contracta ensures that no reversal of flow bypasses flow control plate set 5. In addition tests have shown that moderate misalignment of impeller assembly 15 on shaft 3 relative to flow control plate set 5 has little adverse effect. While the impeller should be midway between upper and lower plates 20, 21, excellent mixing occurs over the entire range of impeller assembly positions from one extreme at which the edge of top cap 32 is aligned with upper flow control plate 20 to the other extreme position in which cap 33 is aligned with lower flow control plate 21. Such misalignment vertically on shaft 3 changes the upper and lower gaps between impeller assembly 15 and flow control plate set 5, but the vena contracta top and bottom which induces additional flow appears to provide an automatic compensation for the misalignment of agitator assembly 15 to maintain uniform return flow of liquid from above and below flow control plates 5.

In operation of column 1 for extraction a liquid mixture to be partitioned between a pair of immiscible solvents of different density is introduced into column 1 at some mid region point thereof via inlet line 41. Heavy (i.e. relatively high density) solvent is introduced at the top of the column via inlet 42. Light (i.e. relatively low density) solvent is admitted at the bottom of the column via inlet 43. The difference in the specific gravities of the two solvents causes a net flow of heavy solvent from top to bottom of column 1 and a net flow of light solvent bottom to top of column 1. Ultimately the heavy solvent extract phase leaves column 1 via outlet line 44 and the light solvent extract phase leaves column 1 via outlet line 45. In each mixing and extraction stage the counter flowing light and heavy solvents are intimately admixed by the action of pumping impeller assembly 15, driven by a motor 46 through gearing 47 and rotating shaft 3, the liquid flow pattern generally being as indicated by the arrows in the drawing. In each mixing stage intimate solvent-solvent contact makes for efficient attainment of near equilibrium state, and overall for efficient liquid-liquid extraction in column 1.

It will be obvious to those skilled in the art that various changes may be made without departing from the spirit of the invention and therefore the invention is not limited to what is shown in the drawings and described in the specification but only as indicated in the appended claims.

What is claimed is:

1. A liquid-liquid extraction column comprising a vertically elongated column divided into a plurality of spaced apart mixing stages by annular baffles which extend radially inward from the column wall, a rotatable shaft extending axially of the column; a plurality of pumping impeller assemblies mounted on said shaft, and rotatable therewith, one in each mixing stage; each said impeller assembly comprising a plurality of vertically disposed agitator vanes surmounted top and bottom by an imperforate cap apertured at the center thereof, the central apertures serving as liquid inlet ports for said impeller assembly, each mixing stage further containing horizontal, spaced apart annular flow control plates therein, the inner edges of said flow control plates being freely supported and spaced radially outward from the outermost edges of the caps of the associated impeller assembly, and the distance between said flow control plates exceeding the height of the vanes and caps at the outermost edges thereof, whereby the vanes of said impeller assembly impel liquid radially outward thereof to the space between said paired control plates, the outer edges of said flow control plates being freely supported and being spaced radially in from the column wall and being of greater radius than the inner edge of said annular baffles to provide thereby a quiescent zone in each stage bounded by the column wall and said annular baffles for phase separation of the liquid impelled thereinto from the space between said flow control plates; and driving means for rotating said rotatable shaft; said column also having top inlet means for heavy solvent, bottom outlet means for heavy solevnt, bottom inlet means for light solvent, top outlet means for light solvent and inlet means at a mid-region of the column for introducing the mixture to be extracted.

2. The apparatus of claim 1 wherein the agitator vanes and caps are shaped to provide about the same area for flow of impelled liquid at all radial distances thereof from said rotatable shaft.

3. The apparatus of claim 2 wherein said area for flow of impelled liquid is also about the area provided for inlet port purposes of said central apertures on said caps.

4. The apparatus of claim 2 wherein said caps are shaped in the form of truncated cones.

5. The apparatus of claim 1 wherein said agitator vanes are flat.

6. The apparatus of claim 1 wherein said agitator blades are curved.

7. The apparatus of claim 1 wherein a plurality of stationary foraminous barriers are vertically disposed between said baffles in said quiescent zone.

8. The apparatus of claim 1 wherein perforated packing means is disposed between said flow control plates adjacent the outer edges thereof.

References Cited

UNITED STATES PATENTS

| | | | |
|---|---|---|---|
| 1,768,957 | 7/1930 | Johnson | 259—96 |
| 2,024,509 | 12/1935 | Chiquoine | 259—96 |
| 2,063,789 | 12/1936 | Burk | 23—270.5 |
| 2,176,899 | 10/1939 | Gordon | 23—270.5 |
| 2,665,196 | 1/1954 | Poffenberger | 23—270.5 |
| 2,850,362 | 9/1958 | Scheibel | 23—270.5 |
| 2,941,872 | 6/1960 | Pilo | 23—270.5 |

FOREIGN PATENTS

| | | |
|---|---|---|
| 1,279,027 | 11/1961 | France. |
| 585,517 | 10/1933 | Germany. |

NORMAN YUDKOFF, *Primary Examiner.*

E. EMERY, *Assistant Examiner.*